United States Patent

Burns et al.

[11] Patent Number: 5,932,690
[45] Date of Patent: Aug. 3, 1999

[54] OPTICAL RECORDING ELEMENTS HAVING RECORDING LAYERS EXHIBITING REDUCED BUBBLE FORMATION

[75] Inventors: Elizabeth G. Burns, Rochester; James C. Fleming, Webster, both of N.Y.

[73] Assignee: Eastman Kodak Company, Rochester, N.Y.

[21] Appl. No.: 08/832,590

[22] Filed: Apr. 2, 1997

Related U.S. Application Data

[62] Division of application No. 08/557,252, Nov. 14, 1995, Pat. No. 5,667,860.

[51] Int. Cl.$^6$ .................................................. C08G 73/06
[52] U.S. Cl. ..................... 528/423; 528/422; 428/64.1; 428/64.2; 428/64.4; 428/64.8; 428/113; 430/270.14; 430/495.1; 430/945; 369/283; 369/288
[58] Field of Search ..................................... 528/422, 423; 428/64.1, 64.2, 64.4, 64.8, 113; 430/270.14, 495.1, 945; 369/283, 288

[56] References Cited

U.S. PATENT DOCUMENTS

| | | | |
|---|---|---|---|
| 4,619,990 | 10/1986 | Elmasry ................................... | 534/573 |
| 4,666,819 | 5/1987 | Elmasry ................................... | 430/270 |
| 4,681,834 | 7/1987 | Simmons et al. ........................ | 430/270 |
| 4,940,618 | 7/1990 | Hamada et al. ........................... | 428/64 |
| 5,407,719 | 4/1995 | Hamada et al. ........................... | 428/64 |
| 5,415,914 | 5/1995 | Arioka et al. .............................. | 428/64 |
| 5,464,673 | 11/1995 | Watanabe et al. ...................... | 428/65.1 |
| 5,556,959 | 9/1996 | Brush et al. . | |

FOREIGN PATENT DOCUMENTS

| | | |
|---|---|---|
| 0 451 718 | of 0000 | European Pat. Off. . |
| 0 194 747 | 9/1986 | European Pat. Off. . |
| 0 492 508 | 7/1992 | European Pat. Off. . |
| 0 513 370 | 11/1992 | European Pat. Off. . |
| 0 519 419 | 12/1992 | European Pat. Off. . |
| 2066706 | of 0000 | France . |
| 86/05504 | 9/1986 | WIPO . |

*Primary Examiner*—Duc Truong
*Attorney, Agent, or Firm*—John R. Everett

[57] ABSTRACT

The present invention discloses an optical recording element having, in the following order, a transparent substrate, a recording layer and a light reflecting layer wherein the recording layer (A) has a real refractive index (N) at 780 nm not less than 1.8 and an imaginary part (k) is not greater than 0.15;

(B) comprises a polymeric cyanine dye that (i) has both a weight-average molecular weight greater than 50,000 and a glass transition temperature (Tg) of less than 150° C.; or (ii) has either (a) a weight-average molecular weight greater than 50,000 or (b) a glass transition temperature (Tg) of less than 150° C.; and (C) a thickness greater than 200 nm.

5 Claims, 1 Drawing Sheet

FIG. 1

OPTICAL RECORDING ELEMENTS HAVING RECORDING LAYERS EXHIBITING REDUCED BUBBLE FORMATION

This is a divisional of application Ser. 08/557,252, filed Nov. 14, 1995, now U.S. Pat No. 5,667,860.

FIELD OF THE INVENTION

This invention relates to optical recording elements.

BACKGROUND OF THE INVENTION

Write-once optical recording elements in a compact disc (CD) format are commercially available. These elements consist of a polycarbonate substrate containing a continuous tracking groove onto which an organic dye recording layer is solvent coated. A reflective layer and a protective layer are coated in that order over the recording layer. Digital information is recorded in the recording layer with a focused beam of a diode laser operating in the near infrared region of the spectrum.

Recording in optical recording elements, such as a write once recording element, results from the chemical and physical change, in the form of marks, which occurs in and around the dye in the recording layer caused by the recording laser. Such marking causes the light of a read laser, operating at lower powers in the near infrared spectral region, to be diffracted (scattered) affording optical contrast in reflected light. This contrast provides the basis for digital recording.

Mechanisms for marking include dye decomposition with bubble formation as in phthalocyanine dye based media (European Patent Applications 0 451 718 A1, 0 519 419 A2, 0 513 370 A1 and 0 492 508 A1, and Canadian Patent Application 2005520 of Mitsui Toatsu Chemicals, Inc.) and dye decomposition without bubble formation as in cyanine dye based media (e.g. U.S. Pat. No. 4,940,618).

We have found that there is an increased tendency for bubble formation in recording layers containing cyanine dyes as the thickness of the recording layer increases. That is, at thicknesses of about 200 nm and beyond there is a strong tendency for bubble formation to occur.

Bubble formation and dye bleach both result in the lowering of the real index of refraction (N) in the marked area. Lowering of the real index of refraction is the fundamental cause of the diffraction or scattering of the light of the read laser. Bubble formation is not a desired mechanism for marking for the following reasons:

1) Bubble formation may not be uniform and may result in distorted waveforms causing both jitter and non-linearity.

2) Bubble formation may cause the recording layer to fracture resulting in noise and jitter in the read channel.

3) Bubbles in the recording layer cause a physical perforation of the layer impairing the physical integrity of the disc structure.

Any and all of these may impact data integrity and lead to read errors in the recovery of the written data either immediately after writing or after some period of keeping and/or use.

SUMMARY OF THE INVENTION

The present invention provides an optical recording element having, in the following order, a transparent substrate, a recording layer and a light reflecting layer wherein the recording layer (A) has a real refractive index (N) at 780 nm not less than 1.8 and an imaginary part (k) is not greater than 0.15;

(B) comprises a polymeric cyanine dye that (i) has both a weight-average molecular weight greater than 50,000 and a glass transition temperature (Tg) of less than 150° C.; or (ii) has either (a) a weight-average molecular weight greater than 50,000 or (b) a glass transition temperature (Tg) of less than 150° C.; and (C) a thickness greater than 200 nm.

The defined polymeric cyanine dyes, when coated at a thickness of over 200 nm greatly reduces or eliminates bubble formation. The novel optical recording elements of this invention are advantageous in that:

1) The reduction of bubble formation results in a more uniform recorded mark resulting in improved data recovery.

2) The reduction of bubble formation precludes the recording layer from fracturing with resultant noise and jitter in the read channel.

3) The reduction of bubble formation in the recording layer reduces physical perforation of the layer providing for improved physical integrity of the disc structure.

These features are of particular advantage at the high recording speeds currently demanded of CD recordable recording elements. Higher recording speeds demand increased recording power, where we have observed an enhanced tendency for bubble formation.

DETAILED DESCRIPTION

The recording layer comprises polymeric cyanine dyes as defined above. Polymeric cyanine dye is defined as a composition having three or more cyanine dye moieties chemically bound in a polymeric backbone. In contrast, monomeric refers to a single dye with one or more chromophores in the dye moiety, but not attached to a polymeric backbone. In useful embodiments the weight-average molecular weight of the polymer is in the range of 50,000 to 10,000,000 and the glass transition temperature (Tg) is in the range 20° C. to 150° C.

Weight-average molecular weight is determined by size exclusion chromatography. Glass transition temperature is determined by differential scanning calorimetry between 0 and 250° C., scanning at 10° C. per minute.

Useful polymeric cyanine dyes are selected from those having structure I as follows:

I wherein:
G represents a divalent radical derived from a cyanine dye of structure (II):

II

A and $A^1$ represent the atoms necessary to form aromatic or substituted aromatic rings such as phenyl or napthyl or heteroaromatic rings such as thiophene or pyridine; said rings may be substituted with $C_1$–$C_4$ alkyl, $C_1$–$C_4$ alkoxy or halogens such as chlorine, bromine or iodine;

B and $B^1$ represent oxygen, sulfur, methylene, or $C_1$ to $C_{10}$ dialkylmethylene such as dimethylmethylene and dibutylmethylene.

D and $D^1$ represent hydrogen, chlorine, or $C_1$ to $C_4$ alkyl; or alternatively D and $D^1$, together with the carbon atoms to which they are attached, combine to form a ring structure such as cyclohexene;

J represents $C_1$–$C_{10}$ alkylene such as ethylene, propylene, butylene and octylene; phenylene, ethylene glycols (—$CH_2CH_2O$—)q, where q is 1–5, benzylene or phenethylene;

X represents an anionic counter ion such as fluoride, chloride, bromide, iodide, perchlorate, tetrafluoroborate, methanesulfonate, trifluoromethanesulfonate, p-toluenesulfonate, heptafluorobutyrate or hexafluorophosphate;

p is 1 or 2;

R represents $C_1$–$C_{20}$ alkylene such as ethylene, propylene, butylene, hexylene, dodecylene and eicosylene; $C_1$–$C_{10}$ aromatic such as phenyl or naphthyl;

cycloalkylene wherein v is 1 to 6;

dialkylenephenyl wherein w and x is 1 to 4;

diphenylalkylene wherein y is 1 to 4;

Z represents linking groups derived from carbonate, urethane, urea, ester or amide; and n represents the number of repeat units needed to build a polymer chain of a size that corresponds to a polystyrene chain of weight average molecular weight (Mw) of 50,000 to 10,000,000.

Representative polymers within structure I are presented in Table 1.

TABLE 1

Example Polymeric Cyanine Dyes of Structure I

| No. | A/A¹ | B/B¹ | J/J¹ | p | R | X | D/D¹ | Z |
|---|---|---|---|---|---|---|---|---|
| E1 | naphthyl(1,2-dimethyl) | C(CH₃)₂ | —(CH₂)₃— | 2 | —(CH₂)₆— | CF₃SO₃⁻ | H | —NH—C(=O)—O— |
| E2 | naphthyl(1,2-dimethyl) | C(CH₃)₂ | —(CH₂)₃— | 2 | —(CH₂)₆— | 4-CH₃-C₆H₄-SO₃⁻ | H | —NH—C(=O)—O— |
| E3 | naphthyl(1,2-dimethyl) | C(CH₃)₂ | —(CH₂)₃— | 2 | —(CH₂)₆— | CF₃SO₃⁻ | H | —NH—C(=O)—O— |
| E4 | naphthyl(1,2-dimethyl) | C(CH₃)₂ | —CH₂-(4-CH₃-C₆H₄)— | 2 | —(CH₂)₄— | CF₃SO₃⁻ | H | —NH—C(=O)—O— |
| E5 | naphthyl(1,2-dimethyl) | C(CH₃)₂ | —(CH₂)₂— | 2 | —(CH₂)₄— | CF₃SO₃⁻ | H | —NH—C(=O)—O— |

TABLE 1-continued

Example Polymeric Cyanine Dyes of Structure I

| No. | A/A¹ | B/B¹ | J/J¹ | p | R | X | D/D¹ | Z |
|---|---|---|---|---|---|---|---|---|
| E6  | dimethyl-naphthalene | C(CH$_3$)$_2$ | —(CH$_2$)$_3$— | 2 | —(CH$_2$)$_{12}$— | BF$_4^-$ | H | —O—C(=O)—NH— |
| E7  | dimethyl-naphthalene | C(CH$_3$)$_2$ | —(CH$_2$)$_2$— | 2 | —CH$_2$—C$_6$H$_4$—C$_6$H$_4$—CH$_2$— | CF$_3$SO$_3^-$ | H | —O—C(=O)—NH— |
| E8  | dimethyl-naphthalene | C(CH$_3$)$_2$ | —(CH$_2$)$_3$— | 2 | —(CH$_2$)$_{12}$— | PF$_6^-$ | H | —O—C(=O)—NH— |
| E9  | dimethyl-naphthalene | C(CH$_3$)$_2$ | —(CH$_2$)$_3$— | 2 | —CH$_2$CH$_2$—O—CH$_2$CH$_2$— | CF$_3$SO$_3^-$ | H | —O—C(=O)—NH— |
| E10 | dimethyl-naphthalene | C(CH$_3$)$_2$ | —(CH$_2$)$_8$— | 2 | —(CH$_2$)$_6$— | CF$_3$SO$_3^-$ | H | —O—C(=O)—NH— |

TABLE 1-continued

Example Polymeric Cyanine Dyes of Structure I

| No. | A/A¹ | B/B¹ | J/J¹ | p | R | X | D/D¹ | Z |
|---|---|---|---|---|---|---|---|---|
| E11 | 2-methylnaphthalene | C(CH₃)₄ | —(CH₂)₂— | 2 | —(CH₂)₁₂— | $CF_3SO_3^-$ | H | —NH—C(=O)—O— |
| E12 | 2-methylnaphthalene | C(CH₃)₄ | —(CH₂)₂— | 2 | —(CH₂)₆— | $BF_4^-$ | H | —NH—C(=O)—O— |
| E13 | 2-methylnaphthalene | C(CH₃)₄ | —(CH₂)₃— | 2 | —(CH₂)₆— | $CF_3SO_3^-$ | H | —NH—C(=O)—O— |
| E14 | 2-methylnaphthalene | C(CH₃)(C₄H₉)₂ | —(CH₂)₂— | 2 | 2,5-dimethylphenylene | $CF_3SO_3^-$ | H | —NH—C(=O)—O— |
| E15 | 2-methylnaphthalene | C(CH₃)₄ | —(CH₂)₂— | 2 | bis(4-methylphenyl)methane linker | 4-methylbenzenesulfonate ($SO_3^-$) | H | —NH—C(=O)—O— |

TABLE 1-continued

Example Polymeric Cyanine Dyes of Structure I

| No. | A/A¹ | B/B¹ | J/J¹ | p | R | X | D/D¹ | Z |
|---|---|---|---|---|---|---|---|---|
| E16 | 1,2-dimethylnaphthalene | C(CH₃)₂ | —(CH₂)₂— | 2 | 2,4-dimethylphenyl | p-toluenesulfonate | H | —O—C(=O)—NH— |
| E17 | 1,2-dimethylnaphthalene | C(CH₃)₂ | —(CH₂)₂— | 2 | sec-pentyl (CH(CH₃)CH₂CH₂CH₃) | CF₃SO₃⁻ | H | —O—C(=O)—NH— |
| E18 | A and B taken together to form: 1,2-dimethyl-benz[cd]indolium | | —(CH₂)₂— | 2 | —(CH₂)₆— | I⁻ | H | —O—C(=O)—NH— |
| E19 | 1,2-dimethylnaphthalene | C(CH₃)₂ | —(CH₂)₂— | 2 | 4,4'-methylenebis(phenyl) (diphenylmethane) | CF₃SO₃⁻ | H | —O—C(=O)—NH— |

TABLE 1-continued

Example Polymeric Cyanine Dyes of Structure I

| No. | A/A¹ | B/B¹ | J/J¹ | p | R | X | D/D¹ | Z |
|---|---|---|---|---|---|---|---|---|
| E20 | A and B taken together to form: [2-methyl-1H-benz[e]indolium ring] | | —(CH₂)₂— | 2 | 3-methylhexyl (CH₃CH(CH₂CH₂CH₂CH₃)CH₂—) | I⁻ | H | —O—C(=O)—NH— |
| E21 | 6-methoxy-1,2-dimethylnaphthalene | C(CH₃)₃ (t-butyl) | —(CH₂)₂— | 2 | —(CH₂)₆— | CF₃SO₃⁻ | H | —O—C(=O)—NH— |
| E22 | 1,2-dimethylnaphthalene | C(CH₃)₃ | 4-propylphenylene | 2 | —(CH₂)₁₂— | CF₃SO₃⁻ | H | —O—C(=O)—NH— |
| E23 | 1,2-dimethylnaphthalene | C(CH₃)₃ | —(CH₂)₂— | 2 | 2,4-dimethylphenylene | CF₃SO₃⁻ | H | —O—C(=O)—NH— |

The following preparation provides a representative method of making the polymeric cyanine dyes used in this invention. In general, cyanine diols or cyanine diamines are prepared. Polymers are then prepared from the diols or diamines according to well known polymerization procedures.

Synthesis of a Cyanine Monomer 2,3,3-trimethyl-(3H)-benz(e)indole (200 g, 1.26 moles) and 2-bromoethanol (500 g, 4 moles) were heated, with stirring, to 100° C. for 24 hrs. The reaction mixture was cooled to 50° C. and poured into 2 L stirring isopropanol. Crystals began to appear after thirty minutes; the mixture was allowed to stir overnight. The crystalline solid was filtered and dried.

The resulting quaternary salt (50 g) was dissolved in 2 L pyridine and the solution brought to reflux. Trimethoxypropene was added from an addition funnel in a steady stream. The reaction mixture was allowed to reflux 15 minutes after the addition, then cooled to room temperature and poured into 16 L stirring ethyl acetate. After stirring for an hour the slurry was left to settle overnight then filtered, washed with 1 L ethyl acetate and dried in a vacuum oven overnight yielding 41 g crude product. The crude product was combined with 1 L 3/1 isopropanol and water and refluxed for thirty minutes then cooled to room temperature. 1 L water was added to precipitate the product which was collected by filtration and dried in a vacuum oven overnight.

The resulting bromide salt, (2.3 g) was slurried in 50 mL methanol and brought to reflux. 3 mL trifluoromethylsulfonic acid was added dropwise to the refluxing slurry. The heat was removed as soon as addition was complete and the mixture was allowed to cool to room temperature. Water (100 mL) was added to the room temperature mixture, and the mixture was filtered to collect the desired salt. The filtrate was washed with water and dried in a vacuum oven overnight.

Synthesis of Polymer Example E1

Under nitrogen, the monomer described above (2 g, 2.88 mmoles) was dissolved in 8 mL dimethylacetamide (Aldrich Sure-Seal). Hexamethylene diisocyanate (0.46 mL, 2.88 mmoles) and dibutyltindilaurate (20 $\mu$L) were added and the reaction vessel was sealed with a rubber septum. The reaction mixture was stirred at 60° C. overnight, then cooled to room temperature and precipitated into 500 mL water. The resulting solid was collected via filtration, and dried in a vacuum oven overnight, yielding 2.45 g (99%) of a reflective solid. Polymer molecular weights were determined by size exclusion chromatography in 20% v/v dichloroacetic acid in dichloromethane containing 0.01M tetrabutylammonium acetate using three 10 mm PLgel mixed-bed columns. The column set was calibrated with narrow-molecular-weight distribution polystyrene standards between 500 and 2,750,000 daltons. Molecular weights are reported as polystyrene equivalents.

Optical Recording Elements

The optical elements of the invention comprise a light transmitting, typically pregrooved substrate, a recording layer overlaying the substrate, a light reflective layer overlaying the recording layer and a protective layer overlaying the light reflective layer. The recording process will produce marks of lower reflectivity than the unmarked areas of the disk when written and read with diode lasers emitting between 770 and 830 nm. It is preferred that the recording layer be selected so that the real part of the complex refractive index (N) of the unwritten light absorptive layer measured with 780 nm light source is not less than 1.8 and the imaginary part (k) is not greater than 0.15.

The substrate may be any transparent material that satisfies the mechanical and optical requirements. The substrates are generally pregrooved with groove depths from 20 nm to 300 nm, groove widths 0.2 to 0.8 $\mu$Error! Bookmark not defined.m and a pitch of 1 to 2 $\mu$Error! Bookmark not defined.m. The preferred material is polycarbonate, other materials are glass, polymethylmethacrylate and other suitable polymeric materials.

The preparation of the recording layer is achieved by spin coating of the polymeric dye by itself, with other dye or dyes, or with other addenda, from a suitable solvent onto the transparent substrate. For coating, the polymeric dye with or without addenda is dissolved in a suitable solvent so that the solids are 20 or less parts by weight to 100 parts of solvent by volume. The recording layer of the element is then overcoated with a metal reflective layer under reduced pressure by resistive heating evaporation or by a sputter method and finally overcoated with a protective resin.

Coating solvents for the recording layer are selected to minimize their effect on the substrate. Useful solvents include alcohols, ethers, esters, hydrocarbons, hydrocarbon halides, cellosolves and ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methoxy-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV curable acrylates. Daicure SD-17™ is used in the following examples.

One preferred protective layer is disclosed in U.S. Pat. No. 5,312,663 in the names of Kosinski and Amell. This application discloses a two layer structure in which the layer adjacent to the reflective layer is spin coated and a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

A particularly useful embodiment of the invention is that of a recordable compact disc wherein the substrate is a 120 mm polycarbonate disc which is 1.2 mm thick and with an embossed tracking groove having a depth of 40 to 300 nm and a width of 200 to 700 nm with a track pitch of 1.6 microns. The reflective layer is gold. The lacquer layer is a photoacrylic layer, 2 to 10 μm thick. Such embodiment, when written, will conform to International Standard ISO/IEC 10149 for CD-ROM optical data discs.

EXAMPLES

The following examples demonstrate the optical recording capability of the recording layer mixtures used in the elements of this invention.

The general procedure used for the characterization of the polymeric dye recording layers of the optical recording elements of this invention was to first determine the optical constants of the dye layer as coated on silicon wafers by using variable angle spectroellipsometry. The optical constants allow for the calculation of the thickness of the dye layers using transmission spectrophotometric data.

For each of the following examples a solution of the selected polymeric cyanine dye, at a concentration of 5% in 2,2,3,3-tetrafluropropanol was prepared and filtered through a 0.2 μm filter. The solution was spin coated onto a featureless polycarbonate disc substrate having a thickness of 1.2 mm and an outer diameter of 120 mm with a central hole of 15 mm diameter. The disc was dried at 60° C. for ten minutes. The spin coating parameters, such as the rotation rate, were adjusted to provide for the desired coating thickness.

After drying, a gold reflective layer, generally of 130 nm thickness, was deposited by a resistive heating process over the surface of the dye recording layer.

A protective lacquer (Daicure SD-17™ from Dainippon Ink and Chemicals Co.) was applied by spin coating onto the gold layer to a thickness of about 5 μm and then UV cured.

Figure 1:
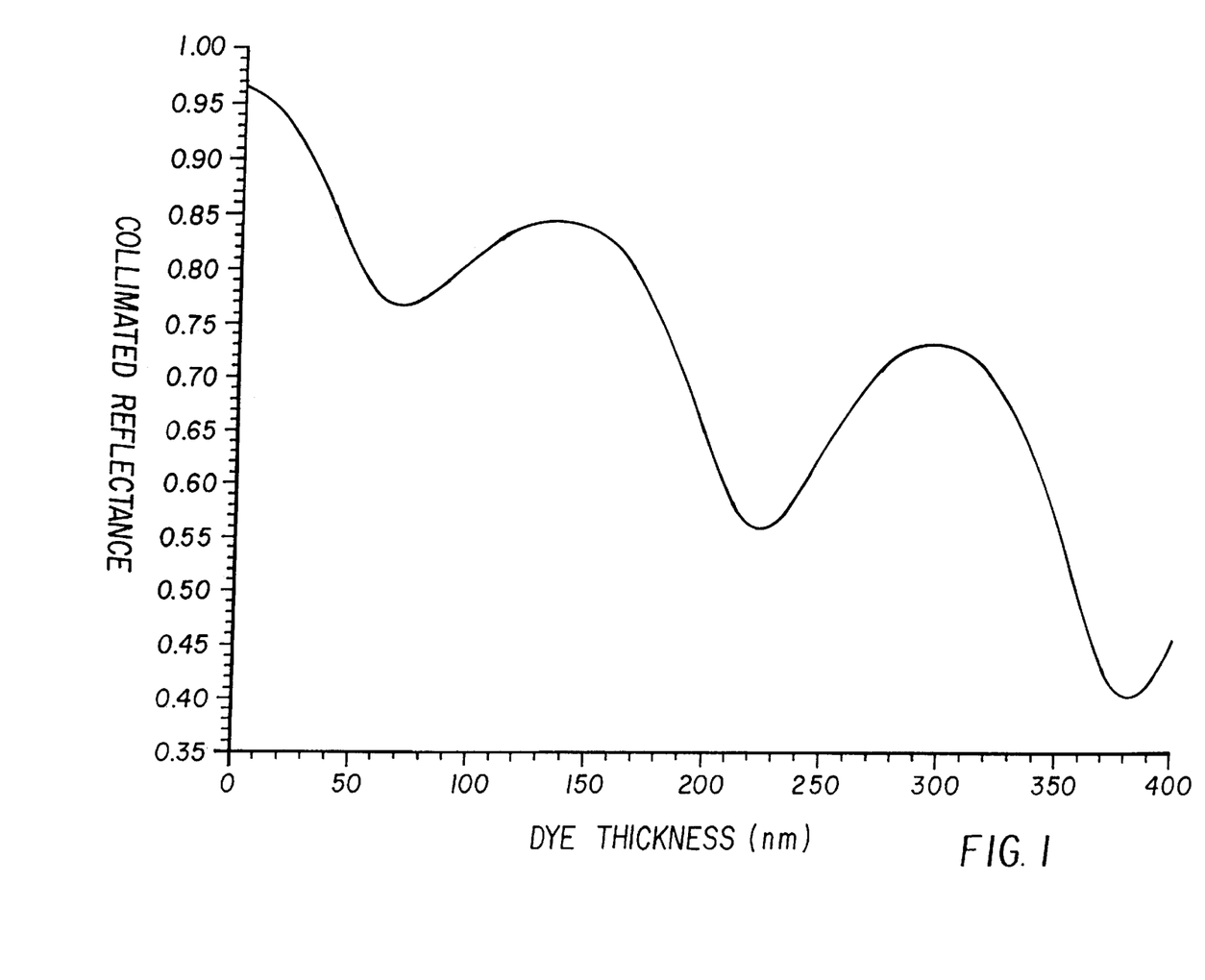
FIG. 1 is a generic drawing of a curve illustrating the relative position of the first and second reflectivity maxima of the polymeric dyes used in this invention. The curve illustrates the second maximum at about 250 to 350 nm.

FIG. 1 shows the calculated collimated reflectivity vs. thickness of a typical recording layer prepared according to the procedure described here. The reflectivity is measured with a collimated beam of light of 788 nm wavelength and measured through the substrate with a gold reflective layer overlaying the recording layer. The first and second reflection maxima at around 140 and 300 nm are due to constructive interference of reflected light from the dye and gold surfaces. It is often desirable to work with dyes coated to the first maxima in order to accommodate the high reflectivity specification for CD recording elements.

We evaluated these dyes at the second reflectivity maximum at about 300 nm, in order to maximize reflectivity. Unexpectedly, we found a unique marking mechanism in the vicinity of the second maximum between 250 and 350 nm. This mechanism involved dye bleach and inhibited bubble formation. Inhibited bubble formation is peculiar to the polymeric dyes defined in the invention. In recording layers having a thickness greater than 200 nm the inhibition of bubble formation is not observed with monomeric cyanine dyes, or with polymeric cyanine dyes outside the scope of the polymeric cyanine dyes defined previously herein. In such recording layers extensive bubble formation occurs.

Bubble formation in the optical recording elements was determined by writing and reading a standard power series of long marks and spaces (I11 in CD terminology, 3.56 microns in length) on the disc through the substrate without the use of tracking. The recording laser operated at a wavelength of 788 nm and the laser spot was focused on the dye layer through an optical head having an objective lens of NA=0.5. The power series of I11 marks was written at 2× recording velocity (2.8 m/s) at 50% duty cycle.

Microscopic analysis of the recorded elements included (a) differential interference contrast (DIC) optical microscopy and scanning tunneling microscopy (STM) of the gold surface at the gold/lacquer interface and (b) scanning electron microscopy (SEM), STM and DIC microscopy of the recording layer surface at the gold/recording layer interface after stripping the gold and lacquer layers from the recording layer surface with sticky tape. This analyses allowed observation of the presence or absence of bubble formation in the recording layer between 1 and 18 mW. Bubble formation data for each of the following examples is presented in Table 2.

Comparative Example 1

A polymeric cyanine dye having a low molecular weight and a high glass transition temperature and having the structure given by E23 of Table 1 was coated to form a recording layer having a thickness of 308 nm. The finished element was recorded as described above.

Example 1 (Invention)

A polymeric cyanine dye having a high molecular weight and a high glass transition temperature and having the structure given by structure E12 of Table 1 was coated to a thickness of 303 nm. The finished disc was recorded as in comparative example 1. The media was quite sensitive and gave excellent optical contrast.

Microscopic analysis of the recorded element of example 1 and comparative example 1 was carried out as described above. The gold surface and the dye surfaces were studied by scanning tunneling microscopy (STM) after the lacquer and gold/lacquer layers were removed with sticky tape. Such analyses allowed one to observe substantial disruption of the recording layer due to bubble formation in comparative example 1. The bubble formation in example 1 was reduced significantly (mixed).

The scanning tunneling microscopic work clearly showed the improved integrity of the recording layer brought about by the use of the polymeric cyanine dyes used in this invention. STM measurements confirmed the absence of bubble formation in marks where physical recording layer disruption was not observed and, in fact, indicated a slight shrinkage of the layer, instead of bubble formation.

Examples 2 and 3 (Invention)

The experiment of example 1 was repeated using the polymeric dye of structure E12, except that the gold layer was modified. In example 2 the gold layer consisted of 80 nm of gold deposited by the resistive heating evaporation process and the recording layer thickness was 318 nm. In example 3 the gold layer consisted of 80 nm of gold deposited by an argon ion sputtering process and the recording layer thickness was 312 nm. Table 2 shows that the results for these two examples were substantially the same as was observed in example 1 (mixed).

Comparative Example 2

The experiment of example 1 was repeated using the polymeric dye of structure E7 of Table 1 coated to a recording layer thickness of 293 nm. The finished element exhibited bubble formation as in comparative example 1.

Example 4 (Invention)

The experiment of example 1 was repeated using the polymeric dye of structure E 11 of Table 1 coated to a recording layer thickness of 323 nm. The finished disc was quite sensitive and gave excellent optical contrast. The optical recording layer was substantially free of bubble formation up to and including 18 mW, well above the optimum recording power of about 11 mW.

Example 5 (Invention)

The experiment of example 1 was repeated using the polymeric dye of structure E19 of Table 1 which was coated to a recording layer thickness of 294 nm. The finished disc was quite sensitive and gave excellent optical contrast The optical recording layer was substantially free of bubble formation up to and including 18 mW, well above the optimum recording power of about 9 mW.

Example 6 (Invention)

The experiment of example 1 was repeated using the polymeric dye of structure E11 of Table 1 coated to a recording layer thickness of 299 nm. The finished disc was quite sensitive and gave excellent optical contrast. The optical recording layer was substantially free of bubble formation up to and including 18 mW, above the optimum recording power of about 9 mW.

The Table summarizes the results of the foregoing examples.

TABLE 2

Bubble Formation Data for Polymeric Recording Layers

| Example No. | $M_w$ | Tg (° C.) | Layer Thickness (nm) | % Ro (nm) | Bubble formation |
|---|---|---|---|---|---|
| Comparative Ex. 1 | 20K | >200 | 308 | 79 | Yes |
| 1 | 76K | 158 | 303 | 83 | Mixed |
| 2 | " | " | 318 | 86 | Mixed |
| 3 | " | " | 312 | 82 | Mixed |
| Comparative Ex. 2 | 31K | >200 | 293 | 79 | Yes |
| 4 | 88K | 94 | 323 | 85 | No |
| 5 | 75K | >200 | 294 | 81 | No |
| 6 | 25K | 138 | 299 | 81 | No |

Unfeatured substrates were employed in the examples of this invention. It is to be understood that the thickness of the recording layer when coating over featured substrates refers to the thickness of the recording layer in the groove where recording occurs in CD recordable elements.

The invention has been described in detail with particular reference to preferred embodiments thereof, but it will be understood that variations and modifications can be effected within the spirit and scope of the invention.

We claim:

1. A polymeric cyanine dye having (i) has both a weight-average molecular weight greater than 50,000 and a glass transition temperature (Tg) of less than 150° C.; or (ii) has either (a) a weight-average molecular weight greater than 50,000 or (b) a glass transition temperature (Tg) of less than 150° C.

2. The polymer of claim 1 wherein the weight-average molecular weight is 50,000 to 10,000,000 and the glass transition temperature is from 20° C. to 150° C.

3. The polymeric cyanine dye of claim 2 having the structure (I):

wherein:

G represents a divalent radical derived from a cyanine dye of structure (II):

A and $A^1$ represent the atoms necessary to form aromatic or substituted aromatic rings such as phenyl or napthyl or heteroaromatic rings such as thiophene or pyridine; said rings may be substituted with $C_1$–$C_4$ alkyl, $C_1$–$C_4$ alkoxy or halogens such as chlorine, bromine or iodine;

B and $B^1$ represent oxygen, sulfur, methylene, or $C_1$ to $C_{10}$ dialkylmethylene such as dimethylmethylene and dibutylmethylene;

D and $D^1$ represent hydrogen, chlorine, or $C_1$ to $C_4$ alkyl; or alternatively D and $D^1$, together with the carbon atoms to which they are attached, combine to form a ring structure such as cyclohexene;

J represents $C_1$–$C_{10}$ alkylene such as ethylene, propylene, butylene and octylene; phenylene, ethylene glycols (—$CH_2CH_2O$—)q, where q is 1–5, benzylene or phenethylene;

X represents an anionic counter ion such as fluoride, chloride, bromide, iodide, perchlorate, tetrafluoroborate, methanesulfonate, trifluoromethanesulfonate, p-toluenesulfonate, heptafluorobutyrate or hexafluorophosphate;

p is 1 or 2;

R represents $C_1$–$C_{20}$ alkylene such as ethylene, propylene, butylene, hexylene, dodecylene and eicosylene; $C_1$–$C_{10}$ aromatic such as phenyl or naphthyl;

cycloalkylene wherein v is 1 to 6;

dialkylenephenyl wherein w and x is 1 to 4;

diphenylalkylene wherein y is 1 to 4;

Z represents linking groups derived from carbonate, urethane, urea, ester or amide; and n represents the number of repeat units needed to build a polymer chain of a size that corresponds to a polystyrene chain of weight average molecular weight (Mw) of 50,000 to 10,000,000.

4. The polymeric cyanine dye of claim 3 selected from Table 1.

5. The polymeric cyanine dye of claim 4 selected from dyes E11, E12 and E15 of Table 1.

* * * * *